United States Patent

[11] 3,615,718

[72] Inventor David Weinstein
 Baltimore, Md.
[21] Appl. No. 648,967
[22] Filed June 26, 1967
[45] Patented Oct. 26, 1971
[73] Assignees Arthur Ozner
 Bellvale, N.Y.;
 Joseph Herman
 Union; Elmer Schuman, Scotch Plains,
 N.J.; George Diamond, Glen Gardner, N.Y.
 , part interest to each
 Continuation-in-part of application Ser. No.
 589,225, Oct. 25, 1966, which is a
 continuation-in-part of application Ser. No.
 560,260, June 24, 1966, now abandoned.

[54] PROCESS FOR THE PREPARATION OF FROZEN
 CONFECTIONS, FOOD MIXES THEREFOR, AND
 AEROSOL PACKAGES CONTAINING SUCH MIXES
 29 Claims, No Drawings
[52] U.S. Cl. .................................................. 99/189,
 99/136
[51] Int. Cl. .................................................. A23g 5/00,
 B65b 31/00
[50] Field of Search ............................................. 99/136, 189

[56] References Cited
 UNITED STATES PATENTS
| 1,548,430 | 8/1925 | Ashley | 99/136 |
| 2,120,297 | 6/1938 | Reinecke | 99/136 |
| 2,849,323 | 8/1958 | Young | 99/189 |
| 3,072,487 | 1/1963 | Webster | 99/189 X |

OTHER REFERENCES

Frandsen et al., Ice Cream and Related Products, Avi Publishing Co., Inc. Westport, Conn. 1961 pp. 28, 31, 44, 46–48, 50, 177, 192– 197

Primary Examiner—Raymond N. Jones
Assistant Examiner—J. M. Hunter
Attorney—John Hirschmann ABSTRACT: Ice cream, ice milk and sherbet mixes having specific compositions and solids contents contained in an aerosol dispenser under pressure and having dissolved therein a gaseous propellant to such a degree that on discharge from the dispenser in a chilled condition the ice cream and ice milk mixes are whipped to an overrun of at least 160 percent, while the sherbet mix is whipped to an overrun of at least 80 percent, all of such discharged mixes being capable of being frozen without separation of liquid.

PROCESS FOR THE PREPARATION OF FROZEN CONFECTIONS, FOOD MIXES THEREFOR, AND AEROSOL PACKAGES CONTAINING SUCH MIXES

The present application is a continuation-in-part of my copending application Ser. No. 589,225, filed Oct. 25, 1966, which in turn is a continuation-in-part of my copending application Ser. No. 560,260, filed June 24, 1966, now abandoned.

The present invention relates to an improved method and means for the instantaneous preparation, particularly in the home but also institutionally for on the location consumers, of a soft form-retaining mass of a whipped aqueous ice cream, ice milk and sherbet mix, characterized by an overrun (the increase in volume over that of the aqueous mix) at least twice the usual overrun and, in the case of ice cream and ice milk, of the order at least of 160 percent or, preferably, of 200 percent and even higher, the whipped mixes and the products obtained on freezing them having a body, texture and general palatability at least equal to those of conventionally prepared ice cream, ice milk and sherbets, despite their increased volume and lower specific weight.

According to the invention, the above-mentioned aqueous mixes are caused to be whipped in a novel manner by a gas or gases dissolved therein, on discharge from a pressurized container in which the mixes are packaged, and with a heretofore unattained high overrun for ice cream, ice milk and sherbet products accompanied by stability at room temperature and on freezing, by a satisfactorily firm body in contrast to the fluffy and foamy products hreretofore obtained on high overrruns, and by feel, flavor, taste and general palatability comparable to those of a superior grade of ice cream, ice milk and sherbets as conventionally prepared. In this way there are obtained, instantaneously, soft confections in a most convenient, expeditious and economical manner and which, on freezing, yield products having a desirably firm body combined with smoothness of texture in the case of ice cream and ice milk, and pleasing feel, flavor and chewability together with a reduced caloric content per unit volume, the products being at the same time free from defects commonly encountered in the standard ice creams, ice milks and sherbets, and reasonably to be expected in even greater degree from the nature of my compositions and their departures from known mixes.

The invention will first be described in connection with the preparation and properties of my novel ice cream mixes and their packaging in pressurized containers and conversion into whipped soft and frozen confections, and variation required for ice milk and sherbet mixes will be described hereinafter.

An ice cream mix must satisfy a large number of requirements to gain consumer favor and to meet legal standards, and represents a complex mixture of various components and whose nature and proportions are so selected as to impart certain desirable qualities and avoid various possible defects in the frozen product, and to this end, a proper balance must be maintained among the various components. Also, one of the most important limitations that ice cream manufacturers must observe is the total solids content of the aqueous mix, which is usually 36 to 39 percent and rarely is 1 or 2 percent higher. Thus, as pointed out on page 31 of Frandsen and Arbuckle, "Ice Cream and Related Products," The Avi Publishing Company, Inc., Westport, Connecticut 1961, "A heavy, soggy product results when the total solids content is too high, usually when above 40 to 42 percent."

The present invention is based on the conception that it would be desirable to provide simple and economical means for preparing a frozen confection, especially in the home, that has all of the properties of a superior grade of ice cream, but is whipped to a heretofore unattained overrun, preferably about 200 percent and above (i.e., three of more times the volume of the original aqueous mix), so that the whipped and ultimately the frozen confection contain a considerably lower weight of total solids per unit volume than standard ice creams. Thereby a product of lower cost per unit volume is obtained and at the same time, one that meets the needs of "weight watchers" to whom a serving of an ice cream product of a volume equal to a serving of standard ice cream, but having a much lower caloric content, will greatly appeal.

However, a useful higher overrun can not be attained by simply increasing the whipped-up volume of standard mixes, for then a fluffy, snowlike, unpalatable product is obtained. Prior teachings are to the effect that difficulties will be encountered if it is attempted to increase the content of various components of standard formulations in the effort to obtain a satisfactory product at higher overruns. Thus the skim milk solids content must not be increased, for that would increase the tendency to lactose crystallization, which produces "sandiness." In fact, so serious is the problem of sandiness caused by crystallization of lactose, that it has led to the use of delactosed milk solids not fat (skim milk solids). In addition, the cane sugar content must be maintained within certain limits, not only to avoid excessive sweetness, but also because the sugar depresses the freezing point, and thus makes freezing more difficult.

Also, in the replacement of a part of the sucrose in ice cream mixes with corn syrup solids, Frandsen & Arbuckle, supra, recommend (page 50) that such solids be limited to from one-fourth to one-third of the sugar content. Prior art teachings are clearly to the effect that the overrun must be limited to a value below 100 percent; and that only rarely can it be allowed to go slightly above this figure.

It is also known that the higher the total solids content of the mix, the lower is the degree of whipping that can be obtained by the heretofore usual methods of whipping ice cream mixes, so that it would be exceedingly difficult, if not impossible, to obtain an overrun of the order of 200 percent with increase of the total solids content to make up for the desired volume increase by the procedures heretofore employed, as by mechanical whipping.

It is further known that if the heretofore produced soft ice cream is frozen in a home freezer and especially if it has been exposed to room temperature even for a short time, it becomes sticky and gummy, and also very hard, so that it no longer has the character of ice cream. This occurs also if frozen ice cream is allowed to stand at room temperature, so that it partially melts and is then refrozen.

Another consideration that cautioned against increase of the solids content was the fact that increase of the solids content necessarily reduces the water content, so that the concentration of the sugar would be increased thereby. This would result in a lowering of the freezing point and make freezing more difficult. Yet despite such lowering of the water content, my intermediate (soft) products can be frozen at the temperature of the home freezer and do not require the lower temperatures used commercially.

I have found that a number of prior practices and precautions must be violated and the mixes unbalanced to produce novel ice cream mixes which, on whipping by a gas or gases dissolved therein and on discharge from a pressurized container, yield products of most pleasing character, and which can be termed an "instant ice cream" (Or "instant" ice milk or sherbet); and which, despite a greatly reduced specific gravity, i.e., a low weight per gallon or liter, nevertheless, both in the chilled intermediate state and on freezing, have a most desirable body, texture, feel, taste and other essential properties of a superior ice creamlike frozen confection and remarkably free from the defects and disadvantages which would be predictable from prior knowledge and experience.

I have discovered that despite increase of the solids content of ice cream mixes in accordance with the invention, a far higher overrun (160 percent to above 250 percent) can be obtained by dispensing from a pressurized container having therein a soluble gas, than by the commonly employed commercial methods of whipping; that despite increase of the skim milk solids (and hence of lactose), in the ice cream and ice milk mixes and even on addition of lactose to the mix, but for reasons not yet fully understood, the whipping action of expanded dissolved gases prevents the expected crystallization of lactose (the cause of sandiness); that despite increase of corn syrup solids, the texture and body of the expanded mix have proved to be highly satisfactory and the whipping is not interfered with; that despite increase of the content of sweetening agents, sugar crystallization does not occur and moderate freezing temperatures are adequate; and that despite a much lower proportionate increase in the total solids content than the degree of overrun, a soft mass is obtained on discharge from the pressurized container which has a body comparing favorably with that of the known soft ice cream, in spite of the latter's much larger content of solids per unit of volume, and which has a firmness superior to that of the known soft ice cream. In fact, the added lactose has been found not only not to crystallize, but to contribute to the retarding of the melting of the soft and frozen products.

Pursuant to the invention, intermediate soft confections of a unique combination of properties are obtained on discharge from an aerosol container at an overrun of about 160 percent to 250 percent for ice cream and ice milk mixes and about 80 percent to 140 percent for sherbet mixes (as contrasted with the commercially obtainable overruns for ice cream, ice milk and sherbet mixes of respectively, about 60 to 100 percent, 40 to 80 percent, and 30 to 50 percent). The soft ice cream and ice milk products have an extremely smooth, mousselike texture, combined with pleasing taste and feel and a firm, shape-retaining body even though the increase in solids content is only about 10 to 25 percent over standard mixes, far less than the increase in volume.

The intermediate soft products, especially when discharged from a chilled container, can be eaten as such. They melt only very slowly, and even after standing at room temperature for an hour or more, they retain their volume and shape and do not show any separation of liquid (i.e., there is no "bleeding"). The whipped up masses accordingly afford the housewife many opportunities for exercising her ingenuity to produce unusually flavored and enriched semifrozen and frozen confections, which cannot be done with partially melted (and thereby softened) frozen conventional ice creams and ice milks, or with soft ice creams, because these, on refreezing, become sticky and gummy. The intermediates of the present invention, on the other hand, are discharged from the pressurized container (chilled or not) at a uniform consistency and temperature, do not melt readily, and can be mixed with different flavors and fillings, such as roasted coffee bean or instant coffee powder, powdered cinnamon, fresh, dried and glazed fruits, nuts and the like, the mixture then frozen in the home freezer. Successive portions of the whipped mix can be differently treated, so that the same pressurized container can be used to yield different frozen confections. This can be done also in institutions and in restaurants for immediate use or for immediate freezing.

Even in the unfrozen condition, and despite its reduced weight per unit volume, the soft intermediate product is characterized by satisfactory body and a pleasing feel and taste; and when frozen, is comparable to a high grade ice cream. When dispensed from a chilled container, it provides an instant soft ice cream and is the only product of this type which can be prepared in the home without a great deal of labor and mechanical equipment. Even after standing at room temperature for some time, it can, unlike conventional ice cream, be frozen from the soft condition without the appearance of crystallization, gumminess or stickiness. The smoothness of texture is retained even after freezing, there being no ice or sugar crystals in the frozen product, which acquires a degree of stiffness, has a pleasing chewability, and is of highly palatable quality.

The stream of whipped ice cream can be used, as it emerges from the nozzle of the, preferably chilled, pressurized container, as topping for fruits, cakes, pancakes, waffles, crepes, conventional ice cream sundaes, and the like, and it is superior to whipped cream when used in coffee. In these uses, it is desirable to avoid too large a proportion of corn syrup solids. In the absence of heat, the chilled topping retains its shape for as much as 1½ hours at room temperature, and in contrast to whipped cream it can be partially or completely frozen to yield tasteful and palatable confections. The unfrozen mousselike confection discharged from the pressurized container also provides an interesting as well as tasty and nutritious food for infants and children to whom frozen products are preferably not given, and is desirably made with sterilized mixes.

Whereas commercial ice cream must be frozen at a temperature at least as low as $-10°$ F. ($-23.3°$ C.) and usually at $-20°$ F. ($-28.9°$ C.) the whipped intermediate products of the present invention can be frozen to a satisfactory hardness in the freezer compartment of a household refrigerator, which is usually at a temperature of about $0°$ to $5°$ F. ($-17.8°$ to $-15.0°$ C.).

In my improved compositions, corn syrup solids are employed to replace part of the sucrose to an extent as high as 40 percent or more. These solids contribute to the body and chewability of the frozen confection and cause no difficulty in the whipping by expansion of dissolved (or suspended) gas.

A small amount of either sodium caseinate or of an edible calcium salt of low solubility, or both, are preferably employed in the mixes, especially the ice cream and ice milk mixes, as they add to the stiffness and body of the product. Among the calcium salts that may be used are the lactate, gluconate, citrate and sulfate.

My improved mixes, even though they contain only about a 10 to 25 percent increase in solids content over conventional formulations, nevertheless yield an expanded mass of satisfactory body and of a delicious feel and flavor, despite an increase in volume of at least twice that of prior methods of whipping and even 3 or more times the volume of the aqueous ice cream or ice milk mix.

When the contents are pasteurized, the pressurized container can be stored at room temperature for a considerable period, and in the refrigerator for about 6 months; when sterilized, the contents remain fresh indefinitely.

What has been said hereinabove with regard to ice cream applies in general also to ice milk, which differs from ice cream principally in a lower fat content. In sherbet mixes, there must be provided the minimum acid requirement of 0.35 percent calculated as citric acid. The sugar and stabilizer contents can be adjusted to produce the texture and consistency characteristic of the known sherbets.

Although the examples hereinbelow employ heavy cream (butterfat) as the source of fat, it will be understood that other animal fat or vegetable fat can be used in place of all or part of the heavy cream.

It will be seen from the foregoing that the invention provides a pressurized container which is only a fraction of the volume of the whipped-up product obtained from it. It enables a householder to prepare instantly and easily a fresh quantity of the desired amount of soft confection which can then be quickly frozen. This affords the additional advantage that the demand on the capacity of the freezer is reduced.

The minimum solids content that has heretofore been considered possible or practical in commercial ice cream manufacture has been 36½percent for a 10 percent fat content and 42 percent for a 16 percent fat content (all percentages herein are by weight), the latter values giving a rather heavy and soggy product. The usual compositions for commercial ice creams are within the following ranges: butterfat, 10 to 16 percent; skim milk solids, 8 to 11 percent; sugar, 13 to 17 percent; stabilizer, 0.25 to 0.5 percent; and emulsifier, 0.25 percent to 0.5 percent.

The usual compositions for ice milk contain the following: butterfat, 2 to 7 percent; skim milk solids 10 to 13 percent; sweetening agents, 14 to 17 percent, and the total solids 29 to 37 percent.

sherbets usually have the following composition: butterfat, 2 percent and skim milk solids about 5 percent (both limited by Federal regulations); and sugar, 25 to 35 percent. The total solids amounts to 32 to 42 percent.

In accordance with the invention, the total solids content has been increased for ice cream mix to a value from 43 percent to about 54 percent; for ice milk to a value from 37 to 47 percent; and for sherbets to a value from 42 to about 59 percent.

Formulations pursuant to the present invention include the following components: For ice cream mix: butterfat, 10 to 16 percent; skim milk solids, 11 to 17 percent, sweetening agents, 17 to 25 percent, lactose (in the absence of a bulky flavoring agent like cocoa), 2 percent, with a total solids content of 43 to 54 percent. For ice milk, butterfat is 3 to 7 percent; skim milk solids, 15 to 17 percent; sweetening agents 18 to 24 percent. For sherbets, butterfat is 2 percent; skim milk solids, 5 percent; sweetening agents, including corn syrup solids, 42–52 percent.

The percentage of butterfat and skim milk solids in sherbet mixes is limited, as above indicated, and I increase the solids content by increasing the amount of sweetening agent and using a considerable proportion of corn syrup solids. I can increase the solids content by adding lactose (which has a lower sweetening effect than sucrose); thus I may add 2 percent lactose to the formula of example 3 below, and reduce the proportion of water correspondingly.

A stabilizer is used in the proportion by weight of about 0.1 to 0.5 percent; and the emulsifier amounts to about 0.1 to 0.2 percent. The mixes may also contain standard flavoring agents, such as vanilla, chocolate, etc. Fresh, sweet cream is the most desirable concentrated source of butterfat for use in the mixes. However, unsalted butter and butter oil may also be used. If a product containing vegetable fat is desired, partially hydrogenated vegetable oil or other acceptable nonanimal fats may be used.

The use of high heat skim milk solids is of advantage and these constitute at least part of the milk solids.

The usual diabetic ice cream mix contains: butterfat, 16 percent; skim milk solids, 7 to 10 percent; sorbitol, 7 to 9 percent, with a total solids content of 30 to 35 percent. In my improved diabetic mix, the butterfat remains the same, but the skim milk solids are increased to 10.4 to 14 percent, and the sorbitol to 14 to 18 percent, while the total solids are increase to 40.4 to 48 percent.

The usual or standard dietetic ice cream mix includes butterfat, skim milk solids, and crystalline sorbitol; and has a total solids content of 25 to 32 percent. In my improved mix, the total solids are increased to 33 to 42 percent and include additionally gum arabic or other vegetable gum.

Various kinds of sweetening agents may be used, including cane and beet sugar, corn syrup and its solids, lactose, and the like. In diabetic mixes, sugar substitutes, like sorbitol, can be used, as well as synthetic sweeteners.

The emulsifiers can be those commonly used in commercial ice cream manufacture, such as mono- and diglycerides of the higher fatty acids, as well as sorbitan and polyoxyethylene derivatives. A highly satisfactory emulsifier is TM 100VS, which is a mixture of 80 percent mono- and diglycerides and 20 percent polyoxyethylene sorbitan stearate. Egg yolk can also be used. These have been found to provide uniform whipping action and yield a product with smoother body and texture.

The stabilizers aid in preventing formation of objectionably large ice crystals. They include seed gums, such as locust bean gum, gelatin (0.3 to 0.5 percent) seaweed derivatives, carrageenins, cellulose gums, and the like.

In packaging the mixes in pressurized containers, they are charged into the container in an amount insufficient to fill it. The gas or mixture of gases is then introduced into the container under a pressure such that the gas or vapor pressure at room temperature is about 80 to 100 lbs./sq. in. (5.62 to 7.03 kg./cm.) The gases which may be used include nitrous oxide, carbon dioxide, nontoxic polyfluoro- and poly-(chlorofluoro)-lower alkanes, like monochloro- pentafluoroethane (Freon 115), and octafluoro-cyclobutane, or any other gases suitable for admixture with foods, alone or in admixture with one another. Preferably, if a combination of nitrous oxide and carbon dioxide is used, the amount of carbon dioxide is less than about 30 percent of the total gas mixture. Similarly, when a mixture of nitrous oxide and Freon 115 is used, it is preferred to employ a mixture containing about 70 percent nitrous oxide and 30 percent of the Freon 115.

It is desirable to provide in the aerosol can a reservoir of liquefied gas which will evaporate as the volume of liquid mix falls and the pressure likewise tends to fall, so that adequate pressure is maintained. With a mixture of 75 percent Freon 115 and 25 percent Freon 318 in liquid form (the latter acting to depress the vapor pressure of the former), a larger proportion of the contents of the pressurized container can be discharged under high pressure. The proportions of the Freon 115 and 318 can also be 60:40 or 50:50 by weight. The gases and their proportions are so selected as to provide the stated pressure at room temperature. The freons can be mixed with nitrous oxide and the latter can sometimes be used alone. Usually about 7 to 15 grams of gas in a pint size (0.47 liter) can will be sufficient. A mixture of 4 to 5 grams of nitrous oxide and 2 grams of Freon 115 has been found to be satisfactory for 12 oz. (0.36 liter) of mix in the pint can. In any case, enough soluble gas is charged into the can to insure continuous whipping action by the expanding gas as the container valve is opened. Even though Freons are not very soluble, yet when the can is shaken, enough becomes suspended in the mix, aided by the emulsifier, to expand and whip the mix on discharge.

By the term "maximum of corresponding standard preparation," as employed in the claims, is meant known ice cream, ice milk, and sherbet mixes having respectively, the commercially usual maximum total solids content disclosed hereinabove.

Various mixes according to the invention are presented below by way of illustration, but the invention is not limited thereto.

EXAMPLE 1

Vanilla Ice Cream Mix (10% Butterfat)

| | % by Weight |
| --- | --- |
| Heavy Cream (36% fat) | 27.80 |
| Skim Milk Powder | 14.00 |
| Cane Sugar | 10.00 |
| Corn Syrup Solids | |
| (42% Dextrose Equivalent) | 6.60 |
| Sodium Caseinate | 0.40 |
| Lactose | 2.00 |
| Locust Bean Gum | 0.13 |
| Carrageenin | 0.02 |
| Emulsifier (TM100VS) | 0.20 |
| Calcium Sulphate | 0.20 |
| Vanilla Extract | 0.0225 |
| Vanilla Oleoresin | |
| (6 oz.strength) | 0.0225 |
| Water | 38.6050 |
| | 100.0000% |

The total solids content of this mix, excluding the vanilla flavoring agent, was 45.02 percent.

This composition was pasteurized at 160° F. for 30 minutes and homogenized. Then, 10 oz. of this mix was placed in a 16 oz. container, and a mixture of 30 percent C-115 Freon and 70 percent nitrous oxide was introduced into the container at a pressure of about 100 lbs./sq. in. (7.05 kg./sq. cm.) at room temperature. This mix was then placed in a refrigerator for a short period of time, and then discharged from the aerosol container into a suitable dish. The soft ice cream product obtained, despite an overrun of over 200 percent, was firm, had the smooth feel and consistency of a mousse, and was found to have a pleasing taste and flavor, comparable to commercial vanilla ice cream. On freezing, it suffered no noticeable loss of volume and no crystallization of sugar was observed. The ice cream product was not heavy, soggy, or sticky. It had a pleasing lightness without being fluffy, and had a desirable "chewiness."

EXAMPLE 2

Vanilla Ice Cream Mix (16% Butterfat)

| | % by Weight |
|---|---|
| Heavy Cream (40% butterfat) | 40.00 |
| Skim Milk Powder | 12.35 |
| Cane Sugar | 9.00 |
| Corn Syrup Solids (42% D.E.) | 5.60 |
| Sodium Caseinate | 0.40 |
| Lactose | 2.00 |
| Locust Bean Gum | 0.11 |
| Carrageenin | 0.02 |
| Emulsifier (TM100VS) | 0.20 |
| Vanilla Extract | 0.0225 |
| Vanilla Oleoresin (6 oz. strength) | 0.0225 |
| Calcium Sulphate | 0.20 |
| Water | 30.0750 |
| | 100.0000% |

The total solids content of the mix, exclusive of the vanilla flavoring agent, was 48 percent.

The mix was treated as described in example 1, and a product was obtained which was similar to the product of example 1, with the taste, body, texture and general palatability of commercial ice cream of equivalent fat content, all despite an overrun of about 240 percent and in increase in solids content of only about 10 percent.

EXAMPLE 3

Ice Mile Mix (6% Butterfat)

| | % by Weight |
|---|---|
| Heavy Cream (40% butterfat) | 15.00 |
| Skim Milk Powder | 15.00 |
| Cane Sugar | 10.00 |
| Corn Syrup Solids (42% Dextrose Equivalent) | 6.60 |
| Lactose | 2.00 |
| Sodium Caseinate | 0.40 |
| Locust Bean Gum | 0.13 |
| Carrageenin | 0.02 |
| Calcium Sulphate | 0.20 |
| Emulsifier (TM100VS) | 0.20 |
| Vanilla Extract | 0.0225 |
| Vanilla Odeoresin (6 oz. strength) | 0.0225 |
| Water | 50.4050 |
| | 100.0000% |

The total solids content, exclusive of the vanilla flavoring agent was 41.33 percent.

The mix was treated as described in example 1.

The product obtained from such mix was comparable in taste and body to commercial ice milk, even though the overrun was about 210 percent from a pressurized container with the above-described mixture of Freon and nitrous oxide at a pressure of about 100 lbs./sq. inch (7.05 kg./sq.cm.).

EXAMPLE 4

Diabetic Ice Cream Mix

| | % by Weight |
|---|---|
| Heavy Cream (40% butterfat) | 40.00 |
| Condensed Skim Milk (30% serum solids) | 26.27 |
| Sorbitol Solution (70%) | 20.00 |
| Sodium Caseinate | 0.40 |
| Calcium Cyclamate | 0.04 |
| Saccharin | 0.01 |
| Locust Bean Gum | 0.12 |
| Carrageenin | 0.02 |
| Calcium Sulphate | 0.20 |
| Emulsifier (TM100VS) | 0.20 |
| Vanilla Extract | 0.0225 |
| Vanilla Oleoresin (6 oz. strength) | 0.0225 |
| Water | 12.6950 |
| | 100.0000% |

The total solids content of the mix was 40.95 percent.

The mix was treated as in example 1, and the diabetic product obtained was comparable in taste and body to commercial ice cream. The overrun was about 205 percent, but neither the soft product discharged by the aerosol container, nor the frozen product was fluffy or foamy.

EXAMPLE 5

Sherbet Mix

| | % by Weight |
|---|---|
| Heavy Cream (40% butterfat) | 5.00 |
| Skim Milk Powder | 4.74 |
| Cane Sugar | 30.00 |
| Corn Syrup Solids (42% Dextrose Equivalent) | 12.00 |
| Locust Bean Gum | 0.14 |
| Carrageenin, Type 2 | 0.02 |
| Calcium Sulfate | 0.20 |
| Emulsifier (TM100VS) | 0.20 |
| Citric Acid | 0.35 |
| Water | 47.35 |
| | 100.00% |

The total solids content of the mix is 48 percent.

The mix was treated as described in example 1. The product so obtained was comparable to the commercial standard sherbet.

There can be added to the mix a synthetic fruit flavor in the usual small proportion, or a suitable quantity of a strained natural fruit juice, the amount of water being reduced correspondingly. The properties of the frozen product can be modified by varying the proportions of the skim milk powder and of the sugars.

EXAMPLE 6

Dietetic Ice Cream Mix

| | % by Weight |
|---|---|
| Heavy Cream (40% butterfat) | 10.00 |
| Skim Milk Powder | 18.00 |
| Crystalline Sorbitol | 10.00 |
| Gum Arabic | 8.00 |
| Locust Bean Gum | 0.10 |
| Emulsifier (TM100VS) | 0.20 |
| Calcium Sulfate | 0.20 |
| Calcium Cyclamate | 0.25 |
| Vanilla Extract | 0.0225 |
| Vanilla Oleoresin (6 oz. strength) | 0.0225 |
| Water | 53.205 |
| | 100.0000% |

The total solids content of the mix, excluding the vanilla flavoring agent, was 41.27 percent.

The mix was treated as in example 1. The refrigerated mix was discharged from the pressurized container at an overrun of over 200 percent. The mass was firm and smooth, and on freezing showed no loss in volume and was comparable in taste and body to commercial dietetic ice cream.

EXAMPLE 7

Chocolate Ice Cream Mix

|  | % by Weight |
|---|---|
| Heavy cream (36% butterfat) | 27.80 |
| Skim Milk Powder | 11.00 |
| Cane Sugar | 13.00 |
| Corn Syrup Solids (42% D.E.) | 6.00 |
| Sodium Caseinate | 0.40 |
| Calcium Sulfate | 0.20 |
| Emulsifier (TM100VS) | 0.20 |
| Locust Bean Gum | 0.12 |
| Carrageenin | 0.02 |
| Cocoa | 3.50 |
| Vanillin | 0.05 |
| Water | 37.71 |
|  | 100.00% |

On discharge of the above mix from a refrigerator-cooled aerosol container which was at about 100 lbs./sq. inch (7.05 kg./sq. cm.), the propellant and whipping agent consisting of a mixture of Freon and nitrous oxide, there was obtained a chocolate mousselike product resembling soft ice cream of extreme smoothness and excellent flavor and which, despite its considerably lower solids content per quart (or liter) than commercial chocolate ice cream, maintained its shape for a considerable time at room temperature, remained free from bleeding, was highly palatable with good body, and on freezing, retained its original volume and had a body, texture, rate of melting in the mouth and general palatability at least equal in all respects to a high grade of ice cream. The overrun was about 235 percent. The solids content of this example amounts to 52.28 percent. The Freon was Freon 115.

I hereby incorporate by reference into this specification all of the disclosure of my above-mentioned pending applications.

What is claimed is:

1. A pressurized valved container having therein an aqueous ice cream mix together with propellant gas under pressure, a part of the gas being dissolved in the mix, the composition and solids content of the mix being such that on discharge of the mix from the container, it is whipped into a form-retaining mass of mousselike body and smoothness of texture which can be frozen to a product of the type of ice cream, the mix containing the following components by weight;

| Fat | 10 to 16% |
|---|---|
| Skim milk solids | 12.35 to 14% |
| Cane sugar | 9 to 10% |
| Corn syrup solids (42% Dextrose Equivalent) | 5.60 to 6.60% |
| Lactose | 2% | together with stabilizing, emulsifying and flavoring agents, and the balance being substantially all water, the solids content of the mix being at least about 43 percent by weight.

2. A pressurized valved container having therein an aqueous ice cream mix together with propellant gas under pressure, a part of the gas being dissolved in the mix, the composition and solids content of the mix being such that on discharge of the mix from the container, it is whipped into a form-retaining mass of mousselike body and smoothness of texture which can be frozen to a product of the type of ice cream, the mix being a chocolate ice cream mix and containing the following components in approximately the indicated proportions by weight;

| Fat | 10 to 16% |
|---|---|
| Skim Milk Powder | 11% |
| Cane Sugar | 13% |
| Corn Syrup Solids (42% Dextrose Equivalent) | 6% |
| Cocoa | 3.5% | together with stabilizing and emulsifying agents, and the balance being substantially all water.

3. A pressurized valved container having therein an aqueous diabetic ice cream mix together with propellant gas under pressure, a part of the gas being dissolved in the mix, the composition and solids content of the mix being such that on discharge of the mix from the container, it is whipped into a form-retaining mass of mousselike body and smoothness of texture which can be frozen to a product of the type of ice cream, the mix containing the following components in approximately the indicated proportions by weight:

| Heavy cream(40% butterfat) | 30 to 40% |
|---|---|
| Condensed skim milk (30% serum solids) | 26 to 30% |
| Sorbitol solution (70%) | 20% |
| Synthetic sweetening agents | 0.05% | together with stabilizing, emulsifying, and stiffening agents and the balance being substantially all water.

4. A pressurized valved container having therein an aqueous dietetic ice cream mix together with propellant gas under pressure, a part of the gas being dissolved in the mix, the composition and solids content of the mix being such that on discharge of the mix from the container, it is whipped into a form-retaining mass of mousselike body and smoothness of texture which can be frozen to a product of the type of ice cream, the mix containing the following components in approximately the indicated proportions by weight:

| Heavy cream (40% butterfat) | 10.00% |
|---|---|
| Skim milk powder | 18.00% |
| Crystalline Sorbitol | 10.00% |
| Gum arabic | 8.00% | together with stabilizing, emulsifying flavoring and stiffening agents, and the balance being substantially all water.

5. A pressurized valved container according to claims 1, wherein the pressure in the container and the composition of the mix are such that an overrun of about 160 to 250 percent is obtained.

6. A pressurized valved container according to claim 5, wherein the overrun is about 200 to 250 percent.

7. A pressurized valved container according to claim 2, wherein the pressure in the container and the composition of the mix are such that an overrun of about 160 to 250 percent is obtained.

8. A pressurized valved container according to claim 7, wherein the overrun is about 200 to 250 percent.

9. An ice cream mix packaged in an aerosol dispenser under the pressure of a gaseous propellant partially dissolved in the mix, said mix being a substantially homogeneous aqueous suspension whose solids content consists essentially of about 10 to 16 percent of an edible fat, about 11 to 17 percent of milk solids nonfat, and about 17 to 25 percent sweetening material, with small proportions of one or more members of the group consisting of emulsifying, stabilizing, thickening and flavoring agents, the total solids content of the mix being approximately in the range of 43 to 54 percent, the balance being substantially all water, the gas being dissolved in the mix to such a degree that on discharge from the dispenser in the chilled condition the mix is whipped by the expanding and escaping gas to an overrun of at least about 160 percent and yields an expanded mass which can be frozen to an ice cream type of product.

10. A pressurized valved container having therein an aqueous ice cream mix together with propellant gas under pressure, a part of the gas being dissolved in the mix, the composition and solids content of the mix being such that on discharge of the mix from the container, it is whipped with an overrun of at least 160 percent into a form-retaining mass of mousselike body and smoothness of texture which can be frozen to a product of the type of ice cream without separation of liquid and without production of stickiness or gumminess, the mix containing the following components in approximately the indicated proportions by weight:

| | |
|---|---|
| Fat | 10 to 16% |
| Skim Milk Powder | 11 to 17% |
| Sweetening Agents | 17 to 25% | together with stabilizing emulsifying and flavoring agents, and the balance being substantially all water.

11. A pressurized container according to claim 9, wherein the mixes contain a small proportion of sodium caseinate and of an edible, slightly soluble calcium salt.

12. A package according to claim 9, wherein the mix includes, by weight, 0.1–0.5 percent stabilizer, and 0.1–0.2 percent emulsifier.

13. A package according to claim 9 wherein the gaseous propellant is selected from the group consisting of monochlor-penta-fluoro ethane, octafluoro-cyclobutane, nitrous oxide and carbon dioxide, and a mixture of said gases.

14. An aerosol package containing a mix as defined in claim 9 and including a small proportion of calcium sulfate.

15. An aerosol package containing a mix as defined in claim 9 wherein the sweetening material comprises one or more artificial sweeteners.

16. A package as defined in claim 9 wherein the mix contains small proportions of an emulsifying agent, a stabilizing agent, and calcium sulfate.

17. An ice cream mix according to claim 16, wherein the sweetening agent includes a quantity of lactose of the order of about 2 percent.

18. The method of preparing a frozen confection composed of the mix as defined in claim 9 in the frozen condition comprising introducing the mix into a container provided with a valve-controlled discharge nozzle, charging said container with a partially soluble gaseous propellant, chilling the container and discharging the mix from the container to provide an expanded, form-retaining mass with an overrun of at least about 160 percent and freezing such mass to an ice cream type of product.

19. Process for the manufacture of a dispensing unit for the substantially instantaneous preparation of a form-retaining mass of whipped mix of the type of ice cream capable of being frozen to a product of good body, texture, and palatability, which comprises packaging a homogeneous aqueous ice cream mix in a valved container, and placing the interior of the container under gas pressure with the aid of a gas which is soluble in the mix, said mix containing about 10 to 16 percent butterfat, about 11 to 17 percent skim milk solids, about 17 to 25 percent sweetening material, and small amounts of an emulsifier, a stabilizing agent and a flavoring agent, the total solids content of the mix ranging from about 43 to 54 percent, the balance being substantially all water, so that upon opening of the container valve, after chilling the container, the mix is discharged with simultaneous whipping thereof to an overrun of 160 to 250 percent by the expansion of the gas dissolved therein to yield a form retaining expanded mass capable of being frozen to an ice cream type of product.

20. Process for the manufacture of a dispensing unit for the substantially instantaneous preparation of a form-retaining mass of whipped mix of the type of ice cream capable of being frozen to a product of good body, texture, and palatability, which comprises packaging a homogenous aqueous ice cream mix in a valved container, and placing the interior of the container under gas pressure with the aid of a gas which is soluble in the mix, said mix containing cream, skim milk solids, sweetening material, an emulsifier, a stabilizing agent, a flavoring agent, and water, the total solids content of the mix ranging from about 43 percent to 54 percent so that upon opening of the container valve, after chilling the container, the mix is discharged with simultaneous whipping thereof to an overrun of 160 to 250 percent by the expansion of the gas dissolved therein to yield a form-retaining expanded mass capable of being frozen to an ice cream type of product.

21. A confectionary food mix packaged in an aerosol dispenser under the pressure of a gaseous propelland partially dissolved in the mix, said mix being a homogeneous aqueous suspension containing the components of ice cream, the solids content of the the mix consisting essentially of an edible fat, milk solids nonfat and sweetening material, with smaller proportions of one or members of the group consisting of emulsifying, stabilizing, thickening and flavoring agents, the total solids content of the ice cream mix being approximately in the range of 43 to 54 percent, the gas being dissolved in the mix to such a degree that on discharge from the dispenser in the chilled condition the mix is whipped by the expanding and escaping gas to an overrun of at least about 160 percent and yields an expanded mass which can be frozen to an ice cream type of product, said mix containing, by weight, 10 to 16 percent butterfat, 11 to 17 percent milk solids nonfat, and 17 to 25 percent sweetening agent, and smaller proportions of an emulsifying agent, a stabilizing agent, and calcium sulfate.

22. A confectionery food mix packaged in an aerosol dispenser under the pressure of a gaseous propellant partially dissolved in the mix, said mix being a substantially homogeneous aqueous suspension containing the components of a member of the group consisting of ice cream, ice milk and sherbet, the solids content of the mix consisting essentially of an edible fat, milk solids nonfat and sweetening material, with smaller proportions of one or more members of the group consisting of emulsifying, stabilizing thickening and flavoring agents, the total solids content of the ice cream, ice milk, and sherbet mixes being approximately in the range of, respectively, 43 to 54 percent, 37 to 47 percent and 42 to 59 percent, the gas being dissolved in the mix to such a degree that on discharge from the dispenser in the chilled condition the mix is whipped by the expanding and escaping gas to an overrun of at least about 160 percent and yields an expanded mass which can be frozen to an ice cream, ice milk or sherbet type of product.

27. A package according to claim 22, wherein the mix is a sherbet mix comprised, by weight, of 1–3 percent butterfat, 3–7 percent milk solids nonfat and 42–52 percent sugar.

24. A package according to claim 23 wherein said mix includes, by weight, 0.1–0.5 percent stabilizer and 0.1–0.2 percent emulsifier.

25. A package according to claim 22, wherein the mix is an ice milk mix comprised of 2–7 percent butterfat, 15–17 percent milk solids nonfat, and 18–24 percent sweetening material.

26. A package according to claim 22, wherein said gaseous propellant is selected from the group consisting of monochloropentafluoroethane, octafluorocyclobutane, nitrous oxide and carbon dioxide, and a mixture of said gases.

27. The method of preparing a mix as defined in claim 22 in the frozen condition comprising introducing the mix into a container provided with a valve-controlled discharge nozzle, charging said container with a partially soluble gaseous propellant, chilling the container and discharging the mix from the container to provide an expanded, form-retaining mass with an overrun of at least about 160 percent, and freezing such mass to an ice cream, ice milk or sherbet type of product.

28. An aerosol package containing a mix as defined in claim 22, and including a small proportion of calcium sulfate.

29. An aerosol package containing a mix as defined in claim 22 wherein the sweetening material comprises saccharin.

* * * * *